(12) United States Patent
Venkiteswaran (10) Patent No.: US 7,089,549 B2
(45) Date of Patent: Aug. 8, 2006

(54) UPDATING FLASH MEMORY (75) Inventor: Sreekrishnan Venkiteswaran, Kerala (IN)

(73) Assignee: International Business Machines Corp., Armonk, NY (US)

( * ) Notice: Subject to any disclaimer, the term of this patent is extended or adjusted under 35 U.S.C. 154(b) by 757 days.

(21) Appl. No.: 10/115,203

(22) Filed: Apr. 1, 2002

(65) Prior Publication Data
US 2003/0229752 A1 Dec. 11, 2003

(51) Int. Cl.
G06F 9/445 (2006.01)
G06F 12/00 (2006.01)
(52) U.S. Cl. .......................... 717/170; 713/2; 711/170
(58) Field of Classification Search ........ 717/168–178; 713/2; 711/170
See application file for complete search history.

(56) References Cited

U.S. PATENT DOCUMENTS

| | | | |
|---|---|---|---|
| 5,210,854 A * | 5/1993 | Beaverton et al. .......... 717/174 |
| 5,594,903 A * | 1/1997 | Bunnell et al. ............. 717/162 |
| 5,647,986 A * | 7/1997 | Nawathe et al. ............ 210/608 |
| 5,701,492 A * | 12/1997 | Wadsworth et al. ........ 717/173 |
| 5,764,992 A * | 6/1998 | Kullick et al. .............. 717/170 |
| 6,317,827 B1 * | 11/2001 | Cooper ......................... 713/2 |
| 6,615,404 B1 * | 9/2003 | Garfunkel et al. .......... 717/173 |
| 6,854,000 B1 * | 2/2005 | Ikegami et al. ............. 707/203 |
| 2003/0182414 A1 * | 9/2003 | O'Neill ...................... 709/223 |
| 2004/0031030 A1 * | 2/2004 | Kidder et al. ............... 717/172 |

* cited by examiner

*Primary Examiner*—Kakali Chaki
*Assistant Examiner*—Trenton J. Roche
(74) *Attorney, Agent, or Firm*—Anthony V. S. England; T. Rao Coca (57) ABSTRACT

Embedded devices typically have an operating system, one or more file-systems, as well as a bootloader and other data components resident in flash memory. During software development and testing, there is frequently a need to selectively update a combination of such images. The described technique organizes the images in the flash memory such that one can speed up the update process by eliminating relocation of existing images. A command-driven update mechanism provides a flexible process—eg, one can upload the images back to a host, one can update the update code itself, etc. A start handshake is used that enables auto-detection of the embedded serial port that is used for the update.

31 Claims, 8 Drawing Sheets

UPDATING FLASH MEMORY

FIELD OF THE INVENTION

The invention relates to selectively updating flash memory, such as portions of code resident in flash memory for use in embedded devices.

BACKGROUND

A typical configuration in many embedded devices is to store and run the operating system from the flash memory (or ROM), and store required data in a non-volatile RAM. However, many pervasive embedded devices have a full-fledged operating system, one or more file-systems, along with a bootloader and other data components, resident in flash memory.

The life of flash memory storage is largely dictated by the number of accesses that occur to flash memory when updating flash memory. Any writes to a flash location are preceded by a corresponding erase. Erasing flash memory is a slow and time consuming process.

During software development and testing, there is a frequent need to update a combination of selected images. Effective flash life time, and speed of development, can be adversely affected if existing images are relocated while performing such selective updates.

In view of the above, a need clearly exists for improved method of updating code in embedded devices that at least attempts to address one or more of the above limitations.

SUMMARY

The proposed technique involves an algorithm for performing updates on flash memory of, for example, an embedded device. The flash memory may contain a combination of images (for example, operating system image, filesystem(s), boot loader etc). Any combination of the images can be updated, without disturbing the images that are not intended to be modified. Replacement images can be bigger than those that they replace, limited only by available physical memory size.

The described technique avoids moving existing images. Moving existing images slows down the updating process and reduces flash life.

The described method of updating flash memory is implemented such that the update logic is itself able to be updated, thus allowing for "intelligent" functionality. This allows further functionality to be added to the update logic, after installation in the flash memory.

Update logic resident in the flash memory responds to instructions from a program executing on an external host, connected to the embedded system through a serial line. Where the flash memory can be accessed through more than one serial port of an embedded device, the update logic automatically detects the serial port via which the external host is connected, using an initial handshake process. The host machine can alternatively communicate with the embedded device using other means, for example, a network connection.

DETAILED DESCRIPTION

Selectively updating one or more portions of the contents of a flash memory (such as in an embedded device) is described herein. The described technique allows for selective updates of parts of embedded flash memory, which provides advantages in increasing the speed of embedded software development while minimising the number of erases and writes to the flash memory.

The term "flash memory" is used herein to describe a type of non-volatile memory in which is an electrically erasable and programmable read-only memory (EEPROM) having a programmable operation which allows for the erasure of blocks of memory. Unless there is a clear and express indication to the contrary, any reference to a "flash memory" is taken to include any non-volatile storage memory in which (i) data can be written only in unwritten or erased physical memory locations and in which (ii) a zone of contiguous physical memory locations are simultaneously erased. For ease of reference, storage memory having such characteristics is referred to as "flash memory".

This minimisation of erases/writes comes about due to a combination of organizing the images in flash memory suitably, and introducing fragmentation if necessary. Any fragmented image can be defragmented prior to product shipment of the embedded device in which the flash memory resides.

A host machine contains the images that are to be updated in the flash memory. For the purposes of the following description, it is assumed that the host machine is to be connected to the embedded device through a serial line. Of course, this general approach is also valid for a network connection, though the initial handshake process will be different.

The embedded device with which the technique is used preferably has a mechanism for determining when to initiate an update. This may be, for example, a jumper setting in the device, or some signal or other indication provided by the host machine etc.

When the embedded device powers on, the boot-loader gets control of the device. If the boot-loader detects that an update indication (such as a software flag, or some form of hardware indication) is ON, the boot-loader copies the update logic to RAM and branches to the update logic. This procedure is needed as most flash memory chips do not support simultaneous writes and reads—which is required if the update logic writes to the flash memory, while also executing from the flash memory. If the boot-loader senses that the update indication is OFF, the boot-loader boots the system. The kernel flash-disk block driver subsequently mounts a file-system resident in flash memory of the embedded device as the root device.

Flash memory is normally organized into banks and further into sectors. Erases can be done only at the granularity of a sector. A flash-write has to follow an erase on the corresponding sector.

In the described arrangement, it is assumed that there is only one file-system image and one kernel image resident in flash memory. It is later explained how the described techniques differ for cases in which there are multiple images and file systems.

Figure 1:
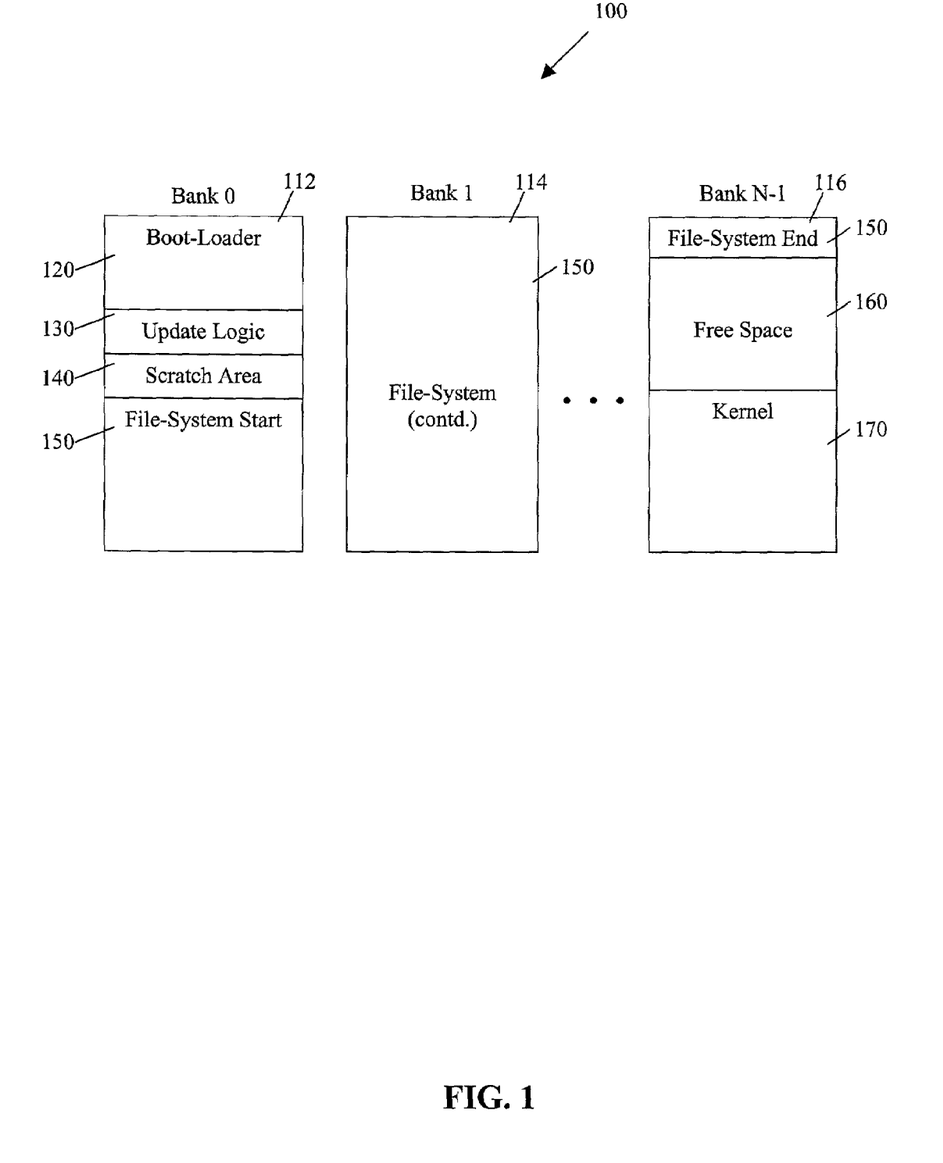
FIG. 1 is a schematic representation of the contents of a flash memory device.

FIG. 1 schematically represents a flash memory 100 used in connection with the techniques described. Physically, the flash memory 100 comprises N banks 112, 114, 116. At the start of the flash memory 100 there is a boot loader 120, followed by the update logic image 130.

Figure 4:
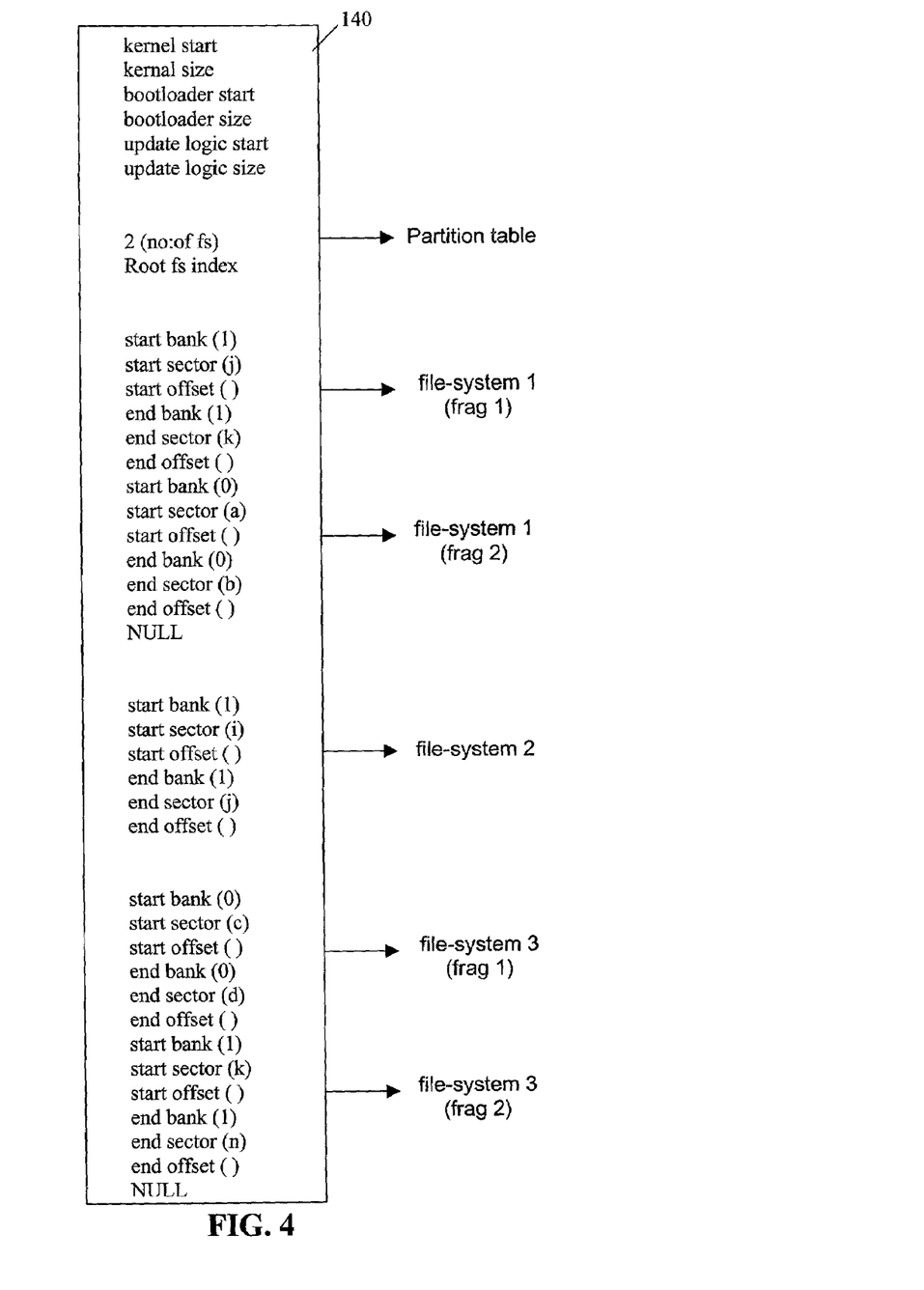
FIG. 4 is a schematic representation of the contents of a scratch area of the flash memory of FIG. 3.

Next, a scratch area 140 contains the start addresses and sizes of all the flash-resident images (as explained below in further detail, with reference to FIG. 4). The scratch area 140 is used by the boot-loader 120 to boot the device. The scratch area 140 is also used by the kernel flash-disk block driver to determine where the file-system 150 starts. The update logic 130 software also needs to use the contents of the scratch area 140 to perform selective updates. From a programming perspective, it is faster (though not necessary) if the scratch area 140 resides in a separate sector from the update logic 130 and the file system 150. If the scratch area 140 is resident in a partly used sector, the remaining contents have to be buffered while re-programming the scratch area 140. The kernel flash-disk driver emulates a disk in flash memory 100, so that one or more file-systems can be resident on the flash memory 100.

Figure 2:
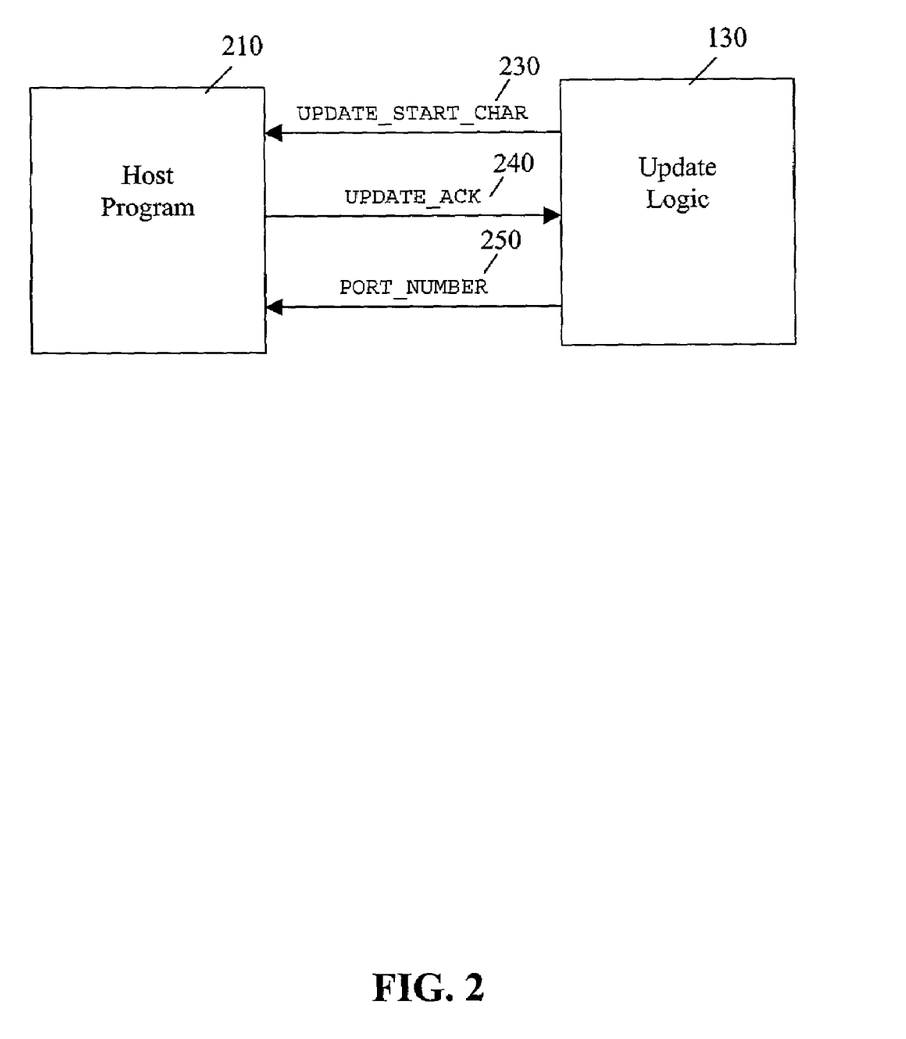
FIG. 2 is a schematic representation of the communication that occurs between update logic stored in the flash memory of FIG. 1, and a host program in a host machine operatively connected with the flash memory of FIG. 1.

FIG. 2 represents the start protocol, between the host resident program 210 executing on the host machine, and the update logic 130 executing on the flash memory 100 of the embedded device.

As soon as the update logic 130 begins execution, it emits a UPDATE_START_CHAR 230 to inform the host resident program 210 on the host machine that it is ready to start the update. If the embedded device has multiple serial ports, the device sends the UPDATE_START_CHAR 230 on all ports. When the host machine receives the UPDATE_START_CHAR 230, the host resident program 210 returns a UPDATE_ACK 240 to acknowledge receipt of the UPDATE_START_CHAR 230. The update logic 130 polls each of the serial ports (using a timeout of, for example, 1 ms) to determine the PORT_NUMBER 250 on which the UPDATE_ACK 240 arrived.

The update logic 130 now knows the serial port to which all reads and writes are to be directed. Now the update logic 130 sends the serial port number (that is, PORT_NUMBER 250) back to the host machine (through the serial port that it just detected), completing the three-way handshake. The host resident program 210 subsequently sends commands to the update logic 130 to configure the serial port that it thus detected, and to immediately switch the serial port to the same configuration.

The start protocol, described immediately above, also enables the implementation of a multi-functional program 210 on the host machine. For instance, certain processor chips used in embedded devices have two boot-modes: (i) a first boot-mode that is used to load the boot-loader 120 and the other images for the first time (code-load), and (ii) a second boot-mode that boots from the top of the flash memory 100. In this second mode, a boot-loader is expected to be resident at the top of the flash memory 100. An example of such a processor chip is the EP7211 produced by Cirrus Logic of Austin, Tex. During different boot modes, different memory addresses obtain control. The software resident at these different memory addresses emits different start characters. By using different start characters for these different modes, the host resident program 210 executing on the host machine determines the boot mode that is active.

The start address for the kernel in flash memory 100, is computed as follows. The highest possible word-aligned address that accommodates the kernel in flash memory 100 is obtained. For this, one calculates backwards from the end address of the last flash memory bank 116. The word-size depends on the flash chip-set used. Certain flash memory chip-sets support "page-write" commands. If the flash memory writes are done using this "page-write" mode, the computed address is the highest possible 'page-aligned' address.

The start address for the file-system image 150 is the first word-aligned (or, "page-aligned", as noted above) address following the scratch area 140. The kernel 170 and the file-system 150 reside at different ends of the flash memory 100. This facilitates selective update of the kernel 170 or the file system 150 for cases in which the replacement image is greater in size than the currently resident kernel 170 or the file-system 150, without physical relocation of images within the flash memory 100, and hence eliminates undesirable erases and writes to the flash memory 100. The size of the updated image is thus limited only by the available capacity of the flash memory 100.

During updates, if the image start ad dress is not recomputed, there is a significant probability (especially while updating file-system images) that some of the sectors that are to be updated have data that has not changed. Only those sectors whose replacement data does not match the original data need be updated. Whether to perform this optimization or not, can be decided by the user at run time, via a special command supported by the update logic. In cases where the replacement image has large differences with the resident image, the above process might slow down the update, even though it could reduce the number of flash erases. This is described in more detail subsequently, in the general case where there are multiple file-system images. In the case of kernel images, revising the start address is preferable to fragmentation, especially if the embedded device executes the kernel in place; that is, runs the kernel directly from flash memory 100.

The kernel 170 is located at the end of the flash memory 100, and the file-system 150 near the start of the flash memory 100, rather than the other way around. This relative arrangement facilitates dynamic file-system extension, if the file-system 150 supports such a mechanism.

A predetermined memory portion at the top of the flash memory 100 can be reserved for the boot-loader 120 and update logic 130 combination. An approach similar to that described above (in respect of the file-system 150 and kernel 170) can be used, wherein the boot-loader 120 and update logic 130 reside at different ends of this reserved memory portion. However, simpler approaches, as later described, can also be used.

To support multiple file-systems, the scratch area 140 has to contain partition information. The partition area contains a set of null-terminated tuples. Each tuple set [(start bank i, start sector i, start offset i), (end bank i, end sector i, end offset i), . . . NULL] represents the different flash fragments where the corresponding file-system resides, the tuple ordering reflecting the fragment ordering. The number of resident file-systems and the index of the root file-system are also part of the partition area.

Figure 3:
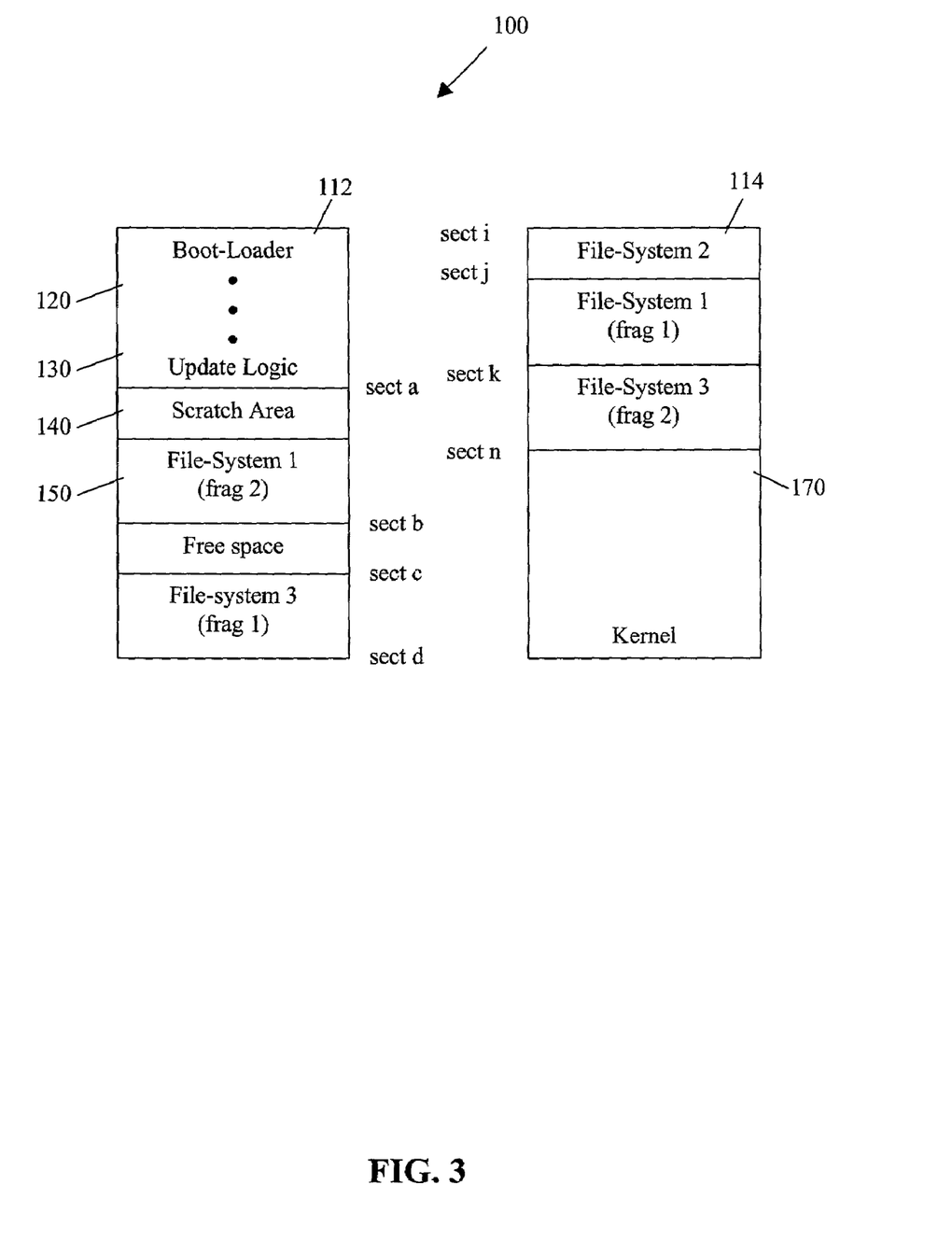
FIG. 3 is an alternative schematic representation of the contents of the flash memory of FIG. 1, in which multiple file systems are resident.

In FIG. 3, "sect a" represents sector number "a", and similar abbreviations are used for other sectors. For convenience, the offsets within the sectors are not shown. FIG. 4 is a schematic representation of the contents of the scratch area 140, as represented in FIG. 3. The core of multiple resident file systems is described in more detail below.

The computed addresses and the image sizes for the various images are stored in the scratch area 140. FIG. 4 schematically indicates the contents of the scratch area 140 for the different images resident in the flash memory 100, as represented in FIG. 3.

Figure 5:
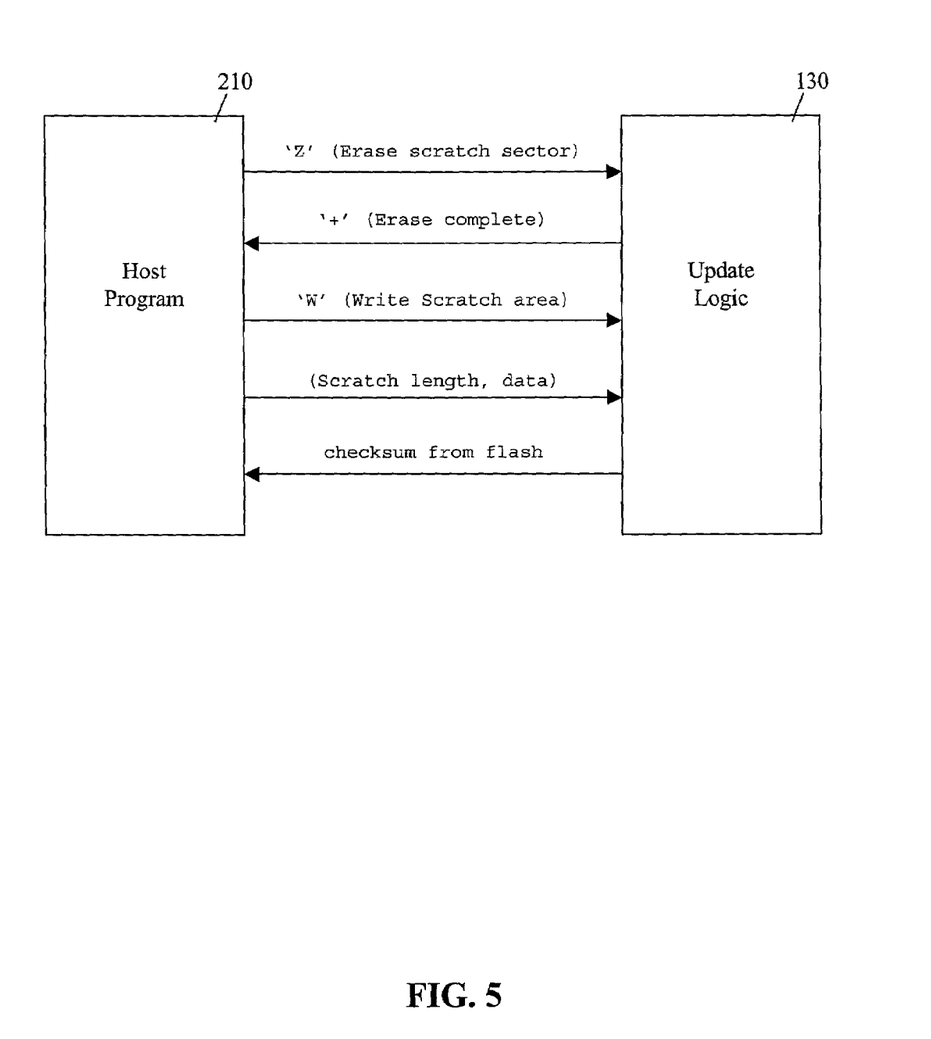
FIG. 5 is a schematic representation of the sequence of communications between the host program and the update logic of FIG. 2 when the scratch area of FIG. 4 is updated.

FIG. 5 is a schematic representation of the sequence of steps that occur between the host resident program 210 and the update logic 130 in the flash memory 100 when the scratch area 140 is to be updated. The sequence of steps is progressively ordered from top to bottom. First, the host resident program 210 sends a "Z" character to the update logic 130, denoting that the sector of the flash memory 100 in which the scratch area 140 is resident is to be erased under control of the update logic 130. Once this step is performed by the update logic 130, a "+" character is sent by the update logic 130 to the host resident program 210 to indicate that the scratch area 140 has been erased.

In response, the host resident program 210 sends a "W" character to the update logic 130, indicating that the erased sector is to be replaced by a revised scratch area 140. The host resident program 210 then writes the length of the scratch area data, followed by the actual data representing the contents of the scratch area. This is received by the update logic 130, and used to write to the scratch area 140 of the flash memory 100.

Once the write process has been completed by the update logic 130, a checksum representing the integrity of the scratch area data is returned by the update logic 130 to the host program. A checksum received from the update logic 130 by the host resident program 210 that agrees with that computed by the host resident program 210 indicates that the updating of the scratch area 140 has been successfully completed.

In order to update only the kernel 170 resident in flash memory, the update logic 130 program performs the following steps:

1. Detecting whether the new kernel 170' will fit into the memory available (the free space available for the new kernel 170' can be calculated from the information present in the scratch area 140). If sufficient capacity is not available, the update is stopped and the user is alerted accordingly.
2. Computing the start address to load the replacement kernel 170' as previously described in relation to the original kernel 170.
3. Computing the location of the sectors to be erased.
4. Erasing the required sectors, located in step 3.
5. Writing the new kernel 170' to flash memory 100. Performing appropriate bank address translation, if the updated kernel 170' spans banks.
6. Computing and returning checksums to the host resident program 210. The checksums are computed and sent for every block of data written to flash memory 100. The host resident program 210 indicates the update progress whenever a checksum value is received, if it matches the value that it expects. If a checksum mismatch is detected, the update is stopped and the user is alerted accordingly.
7. Reading the contents of the scratch area 140. Erasing the scratch area 140 and updating the scratch area 140 using new values for kernel start and kernel size.

If the kernel start-address is in the same sector as the end of the resident file-system 150, special care is taken in updating this sector—the bytes used by the file-system 150 in this sector are temporarily saved before the erase, and then copied back as appropriate to maintain the integrity of the contents of the memory 100 that are not updated.

The scratch sector erase should not be performed along with step 3, because if the host program terminates in the middle of the selective update, we would end up effectively losing the file-system image also.

In order to instead update only the flash resident file-system 150, the update logic 130 program performs the following steps:

1. Detecting whether the new file-system 150' will fit into the memory available (the free space available for the new file-system 150' can be calculated from the information present in the scratch area 140). If sufficient capacity is not available, the update is stopped and the user is alerted accordingly.
2. Computing the start address for the replacement file-system image 150' as the first word-aligned address following the scratch area, as previously described.
3. Computing the location of the sectors to be erased. Only those sectors whose replacement data differs from the original data needs to be replaced, as previously described.
4. Erasing the required sectors computed in step 3.
5. Writing the replacement file-system 150' image to flash memory 100. Performing appropriate bank address translation if the update spans banks.
6. Computing and returning checksums to the host resident program 210 on the host machine. The checksums are computed and sent for every block of data written to flash. The host resident program 210 indicates the update progress whenever a checksum value is received, if it matches the value that it expects. If a checksum mismatch is detected, the update is stopped and the user is alerted accordingly.
7. Reading the contents of the scratch area 140. Erasing the scratch area 140 and updating the scratch area 140 using the newly computed values for file-system start and end addresses.

If the kernel start-address is in the same sector as the end address of the file system, special care is taken in updating this sector—the bytes used by the kernel 170 in this sector are temporarily saved before the erase, and then copied back as appropriate, to maintain the integrity of the contents of the memory 100 that is not updated.

The scratch sector erase should not be performed along with step 3, because if the host resident program 210 terminates in the middle of the selective update, the kernel image 170 is effectively lost.

An approach analogous to that used for the kernel 170/file-system 150 combination described above, can also be used for the boot-loader 120/update logic 130 combination. A predetermined size can be reserved for the boot-loader/update logic combination—both residing at different ends of the reserved memory portion of the flash memory 100, as noted above. This technique can be simplified if it can be assumed that the boot-loader 120 and update logic 130 are updated together.

Many flash memory chips have initial sectors whose sizes are small. In that case, it is realistic for the boot-loader 120 and update logic 130 to occupy separate predetermined sectors (say sector 0 and sector 1). In this case, selectively updating them is more convenient. As with the steps described above, the new start address and size information is updated in the scratch area 140 once the update is complete.

It is described above how a combination of images are selective updated. For instance, one can update just the boot-loader 120 and the kernel 170 without disturbing the other images, obviating erases and writes in other parts of the flash memory 100.

A total update (of all the flash resident images) is relatively straight forward. The relevant steps are as follows:
1. Erasing all sectors.
2. Computing the start address for the images (boot-loader 120, update logic 130, kernel image 170 and file-system image 150), as described above. Updating the scratch area 140 with these new values.
3. Writing the new images to the flash memory at the computed addresses. Performing appropriate bank address translation, if necessary.
4. Computing and returning checksums to the host resident program 210. The checksums are computed and sent for every block of data written to flash memory 100. The host resident program 210 indicates the update progress whenever a checksum value is received, if it matches the value that it expects. If a checksum mismatch is detected, the update is stopped and the user is alerted accordingly.

The update logic 130 also supports reverse updates (that is, copying combination of images from the flash memory 100 of the embedded device back to the host machine). This is useful for taking file-system backups, debugging crashes, etc.

For example, if a file-system image 150 is to be uploaded from the embedded device to the host machine, the update logic 130 does the following (similar steps can be followed to upload other combinations of flash-resident images):
1. Determining the file-system start and end addresses from the scratch area 140.
2. Sending the file-system size back to the host resident program 210.
3. Reading the file-system image 150 from the above-determined start address, and transmitting it back to the host resident program 210.
4. Computing (by the host resident program 210) the checksum, and sending the checksum back to the update logic 130. The update logic 130 flags an error to the host resident program 210 if the checksum value received by the update logic 130 does not match the value that it expects.

The embedded device may have multiple file-system images or kernel images resident in the flash memory 100. It is now assumed for convenience and ease of illustration that only multiple file-system images are present. However, the described procedure in general holds for multiple kernel images also.

The update logic 130, as described above, supports selective updates of a file-system image 150, without changing or relocating other resident image(s). Further, as an updated image can be bigger or smaller than the original one, image replacement can result in the file-systems becoming fragmented (that is, each file-system could end up occupying non-contiguous areas in the flash memory 100). This is because, the update logic 130 would use space available in disjointed (that is, non-contiguous) memory fragments in the flash memory 100 rather than physically move resident images between different memory locations within the flash memory 100.

Whenever the update logic 130 decides to use a fragment, the update logic 130 updates the partition information in the scratch area 140. This process is described in further detail below. FIG. 3 is a schematic representation of an example of how a portion of the flash memory 100 may be occupied after a few selective updates to the memory 100 in which there are multiple file systems.

Figure 6A:
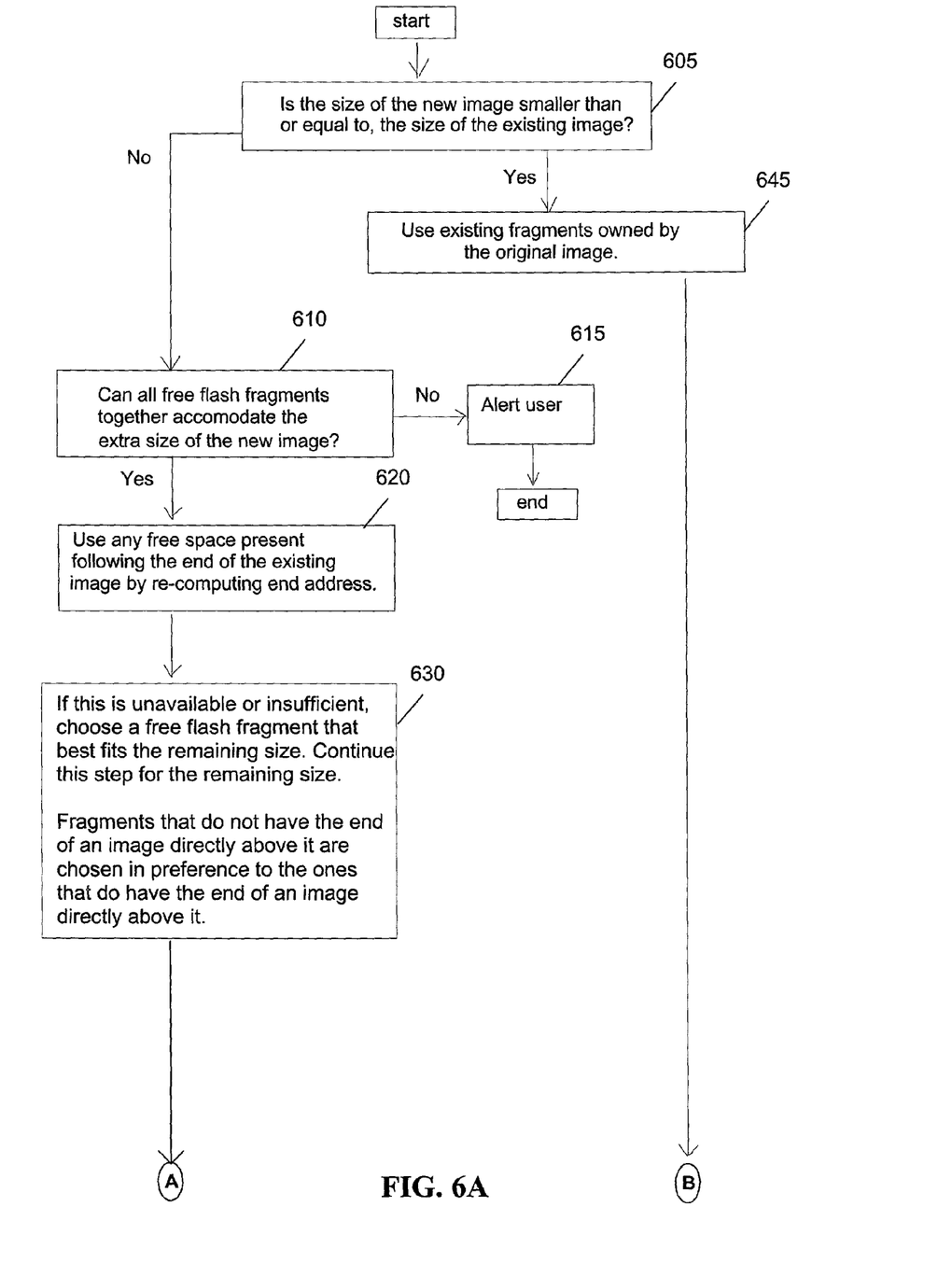
FIGS. 6A and 6B jointly represent a flowchart of the steps that occur when the contents of a flash memory is updated.
Figure 6B:
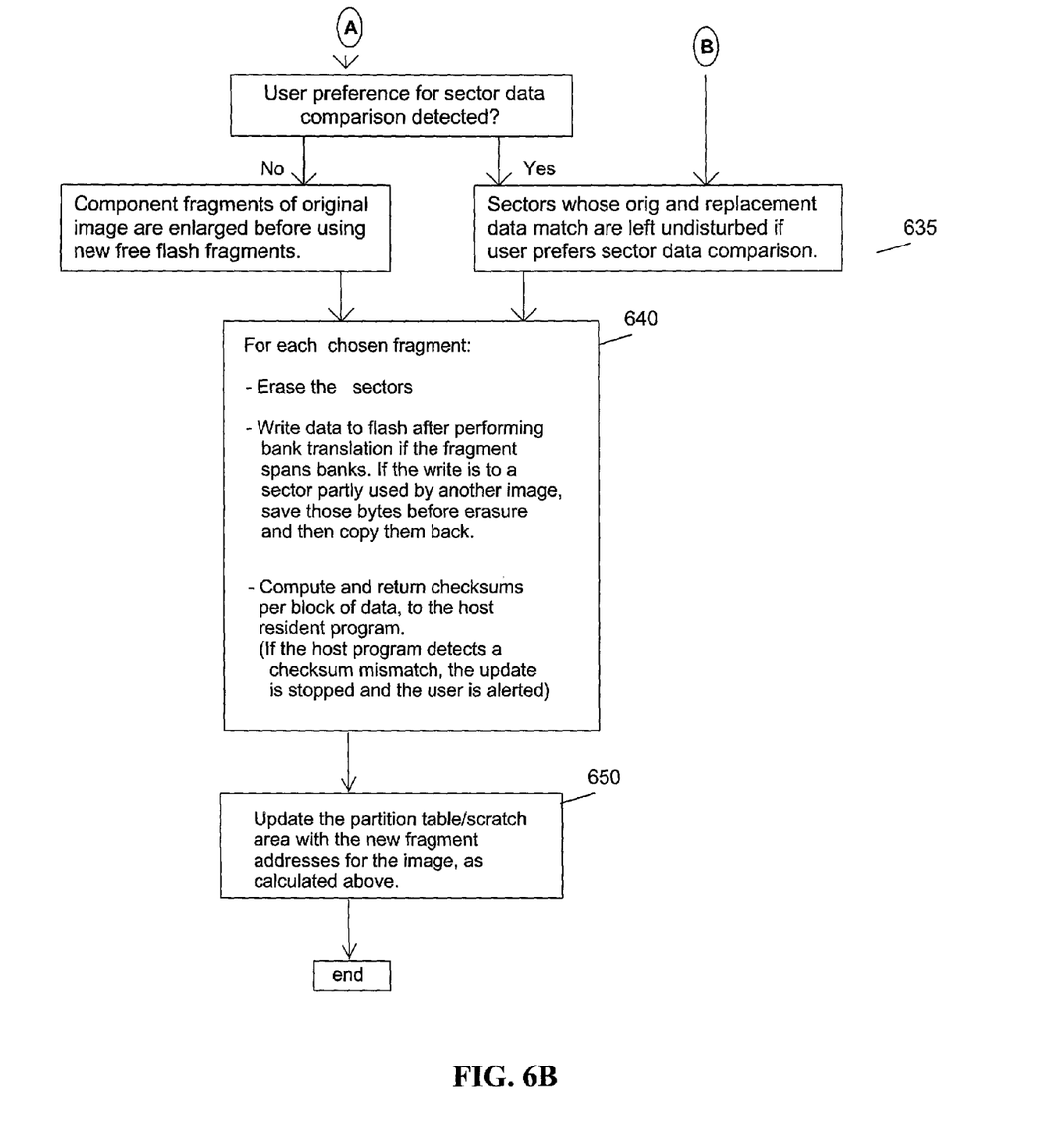

FIGS. 6A and 6B jointly represent a flowchart of steps that occur for a generalized case in which there are multiple file-systems. In this instance, the algorithm for selectively updating a file-system becomes more complex than described above. With reference to FIGS. 6A and 6B, the steps involved are as follows:
1. It is first determined in step 605 whether the size of the new file-system image is smaller than or equal to the size of the existing file-system image. If the size of the new image is smaller than or equal to the size of the existing image, the new file-system uses the needed fragments out of the ones owned by the original image, in step 645.
2. If the updated file-system image is larger than the existing size, it is determined in step 610 whether all the free flash fragments can together accommodate the extra size of the new file-system image. (The location of free flash fragments can be figured out from the tuple information in the partition table). If the physical memory capacity available is not sufficient, the update is stopped and the user is alerted in step 615.
3. Else if there is sufficient space, any free space following the existing image is used in step 620, in addition to the original fragments, by recomputing the end address of the last component fragment accordingly.
4. If that is insufficient or unavailable, a free flash fragment that best fits the remaining size is chosen in step 630. If the largest free fragment is smaller than the needed size, that is used and the same procedure is continued for the remaining size. Fragments that do not have the end of another image directly above it are used in preference to the ones that do have the end of another image directly above it.
5.
    (a) While writing data to pre-existing fragments, the following process is followed in step 635. Sectors whose original and replacement data match, are left undisturbed. For this, bytes that are being received from the external host are buffered for the sector that is being currently updated. The comparison between the received data and the data present in the corresponding sector is stopped as soon as a mismatch is detected. Whether to perform the above optimization or not, can be controlled by the user at run time, via a special command supported by the update logic. This is because, in cases where the replacement image has large differences with the resident image, the above comparison might slow down the update process, even though it could reduce the number of flash erases and writes.
    (b) If the user does not want the above optimisation, the update logic first expands the component fragments wherever possible, before making use of the new free fragments described in step 4. Fragments that do not have the end of another image directly preceding the fragment are enlarged in preference to the fragments that do have the end of another image directly above the fragment.
    (c) The necessary sectors are erased, data is written to flash, bank translation is performed if the fragment spans banks, and checksums are computed and sent to the host in step 640. If the write is to a sector partly being used by another image, the relevant bytes are saved and copied back to their former position to maintain the integrity of the unaltered portions.

6. Once the new image has been updated in step 645 or steps 610 to 640, the partition table is also updated in step 650 with the new fragment information (start and end addresses of each fragment) for each updated file-system.

The writes to the partition table (that is, involving the scratch area 140) are done onto a cached copy. The partition table is written back to the flash at the end of the update process.

The update logic 130 also supports a "defrag" command (that is, one that defragments the contents of the flash memory 100). When the host resident program 210 issues this command, the update logic 130 makes each image reside in a physically contiguous area, using RAM for temporary storage.

Selective file-system updates as described above will be used during embedded software development, and the 'defrag' command will be used prior to product shipment. 'Defrag' would eliminate the burden of extra translation logic inside the kernel flash-disk block device driver. If the file-systems in the flash are fragmented, the kernel flash-disk device driver will have to do extra translation on the offsets generated by the file-system, to locate the correct physical bank, sector and sector offset.

The techniques described above are driven by a host resident program 210 resident on the host machine. The host machine sends a series of commands to the update logic 130. In response, the update logic 130 processes these commands and returns the results back to the host resident program 210 on the host machine.

For example, if the host machine wants the update logic 130 to erase the scratch area 140, the host program 210, sends a command to the update logic 130. Erasing a sector typically takes a few milliseconds. The update logic 130 sends back an acknowledgment (ACK) when it completes the erase. The host waits till the ACK arrives, before sending the next command to the update logic 130.

Computer Hardware

The above described process involves a host machine from which the updated image originates. The host machine, and the host resident program 210 that executes on the host machine can be implemented using a computer program product in conjunction with a computer system 700 as shown in FIG. 3. In particular, the process performed by the host resident program 210 can be implemented as a computer software program, or some other form of programmed code, executing on the computer system 700.

Figure 7:
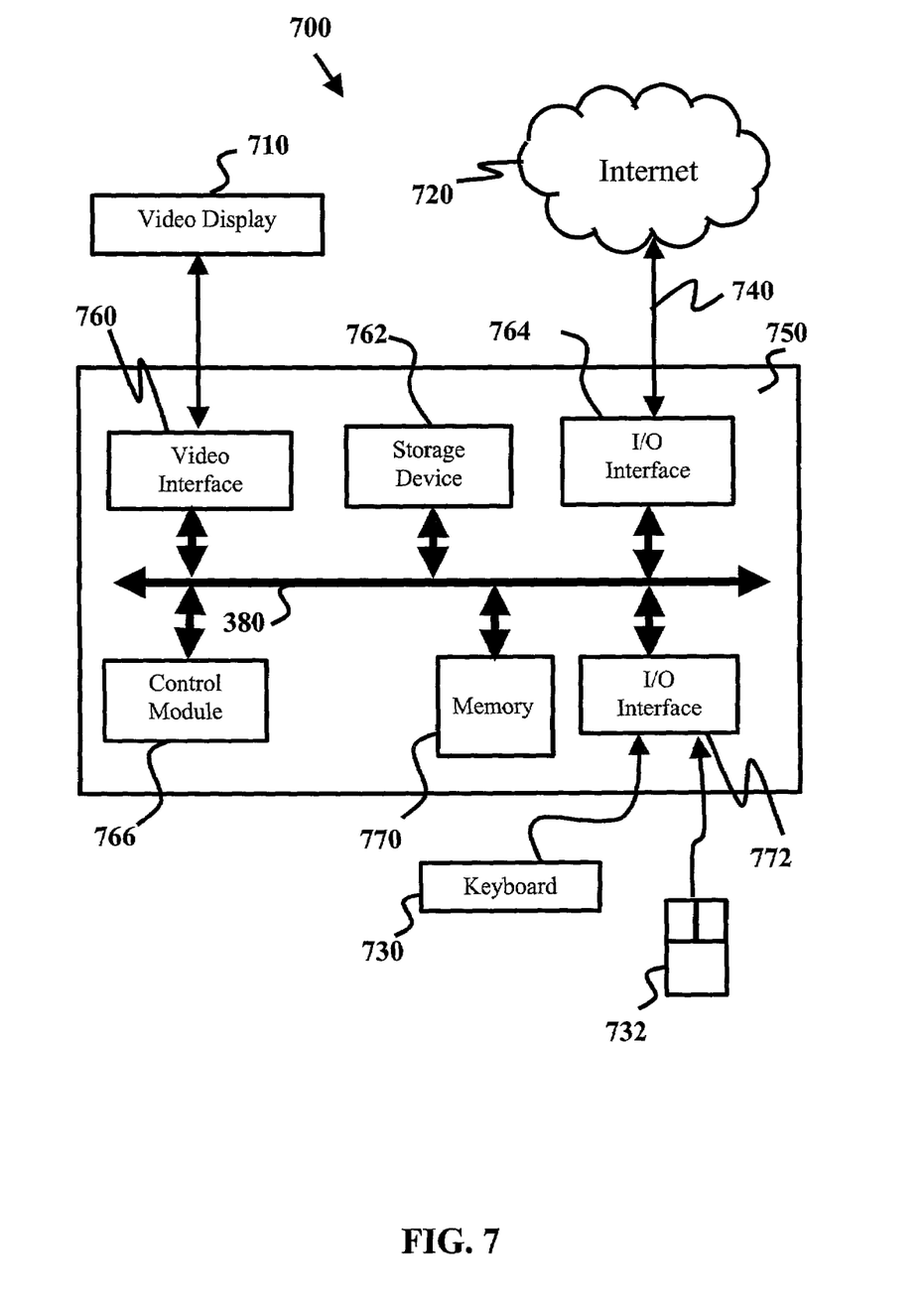
FIG. 7 is a schematic representation of a host machine computer system which executes the host program of FIG. 2.

The computer system 700 includes a computer 750, a video display 710, and input devices 730, 732. The computer system 700 can have any of a number of other output devices including line printers, laser printers, plotters, and other reproduction devices connected to the computer 750. The computer system 700 can be connected to one or more other similar computers via a communication input/output (I/O) interface 764 using an appropriate communication channel 740 such as a modem communications path, an electronic network, or the like. The network may include a local area network (LAN), a wide area network (WAN), an Intranet, and/or the Internet 720, as represented.

The computer 750 includes the control module 766, a memory 770 that may include random access memory (RAM) and read-only memory (ROM), input output (I/O) interfaces 764, 772, a video interface 760, and one or more storage devices generally represented by the storage device 762. The control module 766 is implemented using a central processing unit (CPU) that executes or runs a computer readable software program code that performs a particular function or related set of functions.

The video interface 760 is connected to the video display 710 and provides video signals from the computer 750 for display on the video display 710. User input to operate the computer 750 can be provided by one or more of the input devices 730, 732 via the I/O interface 772. For example, a user of the computer 750 can use a keyboard as I/O interface 730 and or a pointing device such as a mouse as I/O interface 732. The keyboard and the mouse provide input to the computer 750. The storage device 762 can consist of one or more of the following: a floppy disk, a hard disk drive, a magneto-optical disk drive, CD-ROM, magnetic tape or any other of a number of existing non-volatile storage devices. Each of the elements in the computer system 750 is typically connected to other devices via a bus 780 that in turn can consist of data, address, and control buses.

The software may be stored in a computer readable medium, including the storage device 762, or downloaded from a remote location via the interface 764 and communications channel 740 from the Internet 720 or another network location or site. The computer system 700 includes the computer readable medium having such software or program code recorded such that instructions of the software or the program code can be carried out.

The computer system 700 is provided for illustrative purposes and other configurations can be employed without departing from the scope and spirit of the invention. The foregoing is merely an example of the types of computers or computer systems with which the embodiments of the invention may be practised. Typically, the processes of the embodiments are resident as software or a computer readable program code recorded on a hard disk drive as the computer readable medium, and read and controlled using the control module 766. Intermediate storage of the program code and any data may be accomplished using the memory 770, possibly in conjunction with the storage device 762.

In some instances, the program may be supplied to the user encoded on a CD-ROM or a floppy disk (both generally depicted by the storage device 762), or alternatively could be read by the user from the network via a modem device connected to the computer 750. Still further, the computer system 700 can load the software from other computer readable media. This may include magnetic tape, a ROM or integrated circuit, a magneto-optical disk, a radio or infra-red transmission channel between the computer and another device, a computer readable card such as a PCMCIA card, and the Internet 720 and Intranets including email transmissions and information recorded on Internet sites and the like. The foregoing are merely examples of relevant computer readable media. Other computer readable media may be used as appropriate.

Further to the above, the described methods can be realised in a centralised fashion in one computer system 700, or in a distributed fashion where different elements are spread across several interconnected computer systems.

Computer program means, or computer program, in the present context means any expression, in any language, code or notation, of a set of instructions intended to cause a system having an information processing capability to perform a particular function either directly or after either or both of the following: a) conversion to another language, code or notation or b) reproduction in a different material form.

Conclusion

As described, the above techniques allow for selective updates of portions of the contents of a flash memory 100 (of, for example, an embedded device) to be performed with relative ease and speed, from a host machine onto the flash memory 100. The method uses a combination of suitably organizing the images in flash memory 100 and introducing fragmentation if necessary, to minimize the number of flash operations, and hence speed up the update process.

Various alterations and modifications can be made to the techniques and arrangements described herein, as would be apparent to one skilled in the relevant art.

I claim:

1. A method of selectively updating, with corresponding replacement images, any combination of one or more images of a plurality of binary images recorded on a memory medium having a plurality of continuous memory sectors that are erased before being rewritten, the method comprising the steps of:
   a) determining whether an updating operation is to be performed;
   b) determining memory addresses of the memory medium at which a corresponding replacement image can be recorded;
   c) erasing said determined memory addresses; and
   d) writing said corresponding replacement image to the determined memory addresses of the memory medium, wherein said one or more binary images comprise: at least one kernel image, at least one file-system image, a boot-loader image, an update logic image and a scratch area image, wherein update logic performs determining step b) responsive to start addresses and sizes of memory medium resident images stored in the scratch area image, and wherein the writing in step d) includes writing replacement data for the replacement image only in respective sectors where the replacement data does not match original data of the replacement image in the respective sectors.

2. The method as claimed in claim 1, wherein said boot-loader image and said update logic image are recorded at different ends of a predetermined portion of the memory medium, wherein the predetermined portion of the memory medium is at the start of the memory medium.

3. The method as claimed in claim 2, wherein said scratch area image is recorded directly following said predetermined portion of the memory medium.

4. A method of selectively updating, with corresponding replacement images, any combination of one or more images of a plurality of binary images recorded on a memory medium having a plurality of contiguous memory sectors that are erased before being rewritten, the method comprising the steps of:
   determining whether an updating operation is to be performed;
   determining memory addresses of the memory medium at which a corresponding replacement image can be recorded;
   erasing said determined memory addresses; and
   writing said corresponding replacement image to the determined memory addresses of the memory medium, wherein said one or more binary images comprise: at least one kernel image, at least one file-system image, a boot-loader image, an update logic image and a scratch area image, wherein said boot-loader image and said update logic image are recorded at different ends of a first predetermined portion of the memory medium at the start of the memory medium, wherein said scratch area image is recorded directly following said predetermined portion of the memory medium, and wherein said kernel image and said file system image are recorded at different ends of a second predetermined portion of the memory medium, following the scratch area image.

5. The method as claimed in claim 4, wherein the file-system image is recorded directly following said scratch area image, and the kernel image is recorded at the end of the memory medium, such that the relative positioning of the file-system image and the kernel image facilitates dynamic file-system extension.

6. The method as claimed in claim 5, wherein said kernel image is recorded starting from the highest possible word-aligned memory address such that the entire kernel image can be accommodated in the memory medium.

7. The method as claimed in claim 1, further comprising the step of: comparing the size of the selected image with the size of the corresponding replacement image.

8. The method as claimed in claim 1, further comprising the steps of:
   determining whether the size of the replacement image is less than or equal to the size of the selected image; and, if not:
   determining whether said replacement image can be accommodated by free capacity in the memory medium.

9. The method as claimed in claim 8, wherein if the size of the replacement image is smaller than or equal to the size of the selected image, the replacement image is written to at least part of one or more memory fragments that comprise the selected image.

10. The method as claimed in claim 8, further comprising the step of: terminating the update operation and alerting the user that there is insufficient free capacity in the memory medium to accommodate the replacement image, if said replacement image cannot be accommodated by free capacity in the memory medium.

11. The method as claimed in claim 8, further comprising the step of: determining whether the replacement image can be accommodated by memory addresses of the selected image and any free memory addresses that directly follow the selected image, if the size of the replacement image is greater than the size of the corresponding replacement image.

12. The method as claimed in claim 11, further comprising the step of:
   revising the recorded end address of the selected image to take into account any free memory addresses directly following the selected image, if the size of replacement image is greater than the size of the corresponding replacement image.

13. The method as claimed in claim 12, further comprising the step of: successively identifying free memory fragments of the memory medium that can each individually accommodate part of the replacement image until the replacement image can be accommodated by the successively identified free fragments in combination.

14. The method as claimed in claim 13, further comprising the step of: identifying one or more memory fragments for the replacement image such that portions of the replacement image can be recorded across a minimum number of memory fragments.

15. A method of selectively updating, with corresponding replacement images, any combination of one or more images of a plurality of binary images recorded on a memory medium having plurality of contiguous memory sectors that are erased before being rewritten, the method comprising the steps of:

determining whether an updating operation is to be performed;

determining memory addresses of the memory medium at which a corresponding replacement image can be recorded;

erasing said determined memory addresses; and writing said corresponding replacement image to the determined memory addresses of the memory medium determining whether the size of the replacement image is less than or equal to the size of the selected image; and, if not:

determining whether said replacement image can be accommodated by free capacity in the memory medium;

determining whether the replacement image can be accommodated by memory addresses of the selected image and any free memory addresses that directly follow the selected image, if the size of the replacement image is greater than the size of the corresponding replacement image;

revising the recorded end address of the selected image to take into account any free memory addresses directly following the selected image, if the size of replacement image is greater than the size of the corresponding replacement image;

successively identifying free memory fragments of the memory medium that can each individually accommodate part of the replacement image until the replacement image can be accommodated by the successively identified free fragments in combination; and identifying one or more memory fragments for the replacement image such that portions of the replacement image can be recorded across a minimum number of memory fragments, wherein said memory fragments that do not have the end address of another image directly preceding the respective fragment are used in preference to fragments that do have the end of another image directly preceding the respective fragment.

16. The method as claimed in claim 15, wherein sectors of the selected image are not replaced with corresponding sectors of the replacement image if such respective sectors match each other exactly.

17. The method as claimed in claim 15, further comprising the step of:

enlarging said memory fragments that comprise said selected image using free memory addresses directly preceding or following each respective fragment comprising said selected image;

wherein said step of enlarging said memory fragments is performed before said step of successively identifying said free memory fragments.

18. The method as claimed in claim 17, wherein said memory fragments that do not have the end of another image directly preceding the respective fragment are enlarged in preference to fragments that do have the end of another image directly preceding the respective fragment.

19. The method as claimed in claim 16 or 18, further comprising the step of:

performing bank translation during said step of writing said corresponding replacement image, if said memory fragments that comprise said selected image span memory banks of the memory medium.

20. The method as claimed in claim 1, further comprising the steps of:

determining if the memory addresses on which the replacement image is to be recorded correspond with memory sectors on which there are recorded images that are not to be updated; and, if so:

temporarily storing the images or portions thereof that are recorded on said memory sectors, before said step of erasing said determined memory addresses;

writing the images or portions thereof back to said memory sectors, after said step of writing said replacement image.

21. A method of selectively updating, with corresponding replacement images, any combination of one or more images of a plurality of binary images recorded on a memory medium having a plurality of contiguous memory sectors that are erased before being rewritten, the method comprising the steps of:

determining whether an updating operation is to be performed;

determining memory addresses of the memory medium at which a corresponding replacement image can be recorded;

erasing said determining memory addresses;

writing said corresponding replacement image to the determined memory addresses of the memory medium, wherein said one or more binary images comprise at least one kernel image, at least one file-system image, a boot-loader image, an update logic image and a scratch area image;

erasing the scratch area image recorded on the memory medium; and writing a replacement scratch area image to replace the scratch area image, after said step of writing the replacement image;

wherein the replacement scratch area image reflects the replacement of the selected image with the replacement image, and is performed after the selected image is replaced with the corresponding selected image.

22. The method as claimed in claim 21, further comprising the step of: initiating the update logic image in response to an internally set flag detected by the boot loader image.

23. The method as claimed in claim 21, further comprising the steps of:

transmitting an initial signal to an external host resident program with which the update logic can communicate through one or more ports of an embedded device;

receiving from the external host resident program an acknowledgment signal indicating that the external host resident program received the initial signal through one of the ports of the embedded device; and transmitting a response signal to the external host resident program, in response to the acknowledgment signal, the response signal identifying the port through which the acknowledgment signal was received from the external host resident program.

24. The method as claimed in claim 23, wherein said initial signal is sent to all ports of the embedded device, and said return acknowledgment signal is received by said update logic image regularly polling all ports of the embedded device, to determine the port through which said update logic image operatively communicates with the external host resident program.

25. The method as claimed in claim 21, further comprising the step of: initiating the update logic image in response to a direction from an external program executing on an external machine operatively connected with the memory medium.

26. The method as claimed in claim 21, wherein said update logic image responds to instructions from a program executing on an external host machine.

27. The method as claimed in claim 26, wherein said replacement image is received externally to the memory medium.

28. The method as claimed in claim 27, further comprising the steps of:
generating one or more checksums, for respective blocks of data, based on the replacement image when recorded on the memory medium; and
transmitting said checksums to said program executing on an external host machine;
wherein said checksums are used to check the integrity of said step of writing said replacement image.

29. The method as claimed in claim 21, further comprising the steps of:
copying said update logic image recorded on the memory medium to random access memory; and
executing said update logic image from random access memory.

30. An update logic image recorded on a memory medium for selectively updating, with corresponding replacement images, any combination of one or more images of a plurality of binary images recorded on the memory medium having a plurality of contiguous memory sectors that are erased before being rewritten, the update logic image comprising:
code means for determining whether an updating operation is to be performed;
code means for determining memory addresses of the memory medium at which a corresponding replacement image can be recorded; code means for erasing said determined memory addresses; and
code means for writing said corresponding replacement image to the determined memory addresses of the memory medium, wherein the code means for determining memory addresses of the memory medium at which a corresponding replacement image can be recorded includes code means responsive to start addresses and sizes of memory medium resident images stored in the scratch area image, and wherein the code means for writing said corresponding replacement image to the determined memory addresses of the memory medium includes code means for writing replacement data for the replacement image only in respective sectors where the replacement data does not match original data of the replacement image in the respective sectors.

31. A memory medium for selectively updating, with corresponding replacement images, any combination of images of a plurality of binary images recorded on the memory medium having a plurality of contiguous memory sectors that are erased before being rewritten, the memory medium comprising;
one or more binary images recorded on the memory medium;
update logic recorded on the memory medium, the update logic comprising:
code means for determining whether an updating operation is to be performed;
code means for determining memory addresses of the memory medium at which said corresponding replacement image can be recorded;
code means for erasing said determined memory addresses; and
code means for writing said corresponding replacement image to the determined memory addresses of the memory medium, wherein the code means for determining memory addresses of the memory medium at which a corresponding replacement image can be recorded includes code means responsive to start addresses and sizes of memory medium resident images stored in the scratch area image, and wherein the code means for writing said corresponding replacement image to the determined memory addresses of the memory medium includes code means for writing replacement data for the replacement image only in respective sectors where the replacement data does not match original data of the replacement image in the respective sectors.

* * * * *